US006243119B1

(12) United States Patent
Orita et al.

(10) Patent No.: US 6,243,119 B1
(45) Date of Patent: Jun. 5, 2001

(54) IMAGE-FORMING SYSTEM

(75) Inventors: Hiroshi Orita, Saitama; Minoru Suzuki, Tochigi; Hiroyuki Saito, Saitama; Katsuyoshi Suzuki; Koichi Furusawa, both of Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/263,746

(22) Filed: Mar. 5, 1999

(30) Foreign Application Priority Data

Mar. 6, 1998 (JP) ................................................ 10-073453

(51) Int. Cl.[7] .................................................... G01D 15/10

(52) U.S. Cl. ............................................................ 347/173

(58) Field of Search .................................... 347/212, 215, 347/172, 173, 211, 227, 118, 181; 400/241.2, 120.01, 120.02, 124.08, 124.09, 124.1, 149, 82

(56) References Cited

U.S. PATENT DOCUMENTS

| | | | |
|---|---|---|---|
| 4,399,209 | 8/1983 | Sanders et al. . | |
| 4,440,846 | 4/1984 | Sanders et al. . | |
| 4,644,376 | 2/1987 | Usami et al. . | |
| 5,015,552 * | 5/1991 | Tamura et al. | 347/172 |
| 5,825,985 | 10/1998 | Asai et al. . | |

FOREIGN PATENT DOCUMENTS

| | | | |
|---|---|---|---|
| 2193687 | 2/1988 | (GB) . | |
| 61-20766 * | 10/1984 | (JP) | B41J/3/54 |
| 4-4960 | 1/1992 | (JP) . | |

* cited by examiner

*Primary Examiner*—N. Le
*Assistant Examiner*—K. Feggins
(74) *Attorney, Agent, or Firm*—Greenblum & Bernstein, P.L.C.

(57) ABSTRACT

A plurality of thermal line heads for different colors, extending perpendicularly to a conveyer path of an image-forming sheet, are aligned along the conveyer path. The thermal line heads are controlled to simultaneously generate image-pixels on printing lines shifted in the direction of the conveyer path, on the image-forming sheet. The printing speed is high due to a plurality of colors being simultaneously printed. The thermal line heads can be applied to high-speed printing of a monochrome image on a heat-sensitive paper.

14 Claims, 6 Drawing Sheets

IMAGE-FORMING SYSTEM

BACKGROUND OF THE INVENTION

1. Field of the Invention

The present invention relates to an image forming system for forming an image on a recording sheet, coated with a layer of micro-capsules filled with dye or ink, by selectively breaking or squashing the micro-capsules in the layer of micro-capsules. Further, the present invention relates to such a recording sheet and an image-forming apparatus, which forms an image on the recording sheet, used in the image-forming system.

2. Description of the Related Art

An image-forming system per se is known, and uses a recording sheet coated with a layer of micro-capsules filled with dye or ink, on which an image is formed by selectively breaking or squashing micro-capsules in the layer of micro-capsules.

For example, in a conventional image-forming system using a recording sheet coated with a layer of micro-capsules in which a shell wall of each micro-capsule is formed from a photo-setting resin, an optical image is formed as a latent image on micro-capsules by exposing it to light rays in accordance with image-pixel signals. Then, the latent image is developed by exerting pressure on the layer of micro-capsules. Namely, the micro-capsules, which are not exposed to the light rays, are broken and squashed, whereby dye or ink seeps out of the broken and squashed micro-capsules, and thus the latent image is visually developed by the seepage of dye or ink.

Of course, in this conventional image-forming system, each recording sheet must be packed so as to be protected from being exposed to light, resulting in wastage of materials. Further, the recording sheets must be handled such that they are not subjected to excess pressure due to the softness of unexposed micro-capsules, resulting in an undesired seepage of dye or ink.

Also, a color-image-forming system, using a recording sheet coated with a layer of micro-capsules filled with different color dye or ink, is known. In this system, the respective different colors are selectively developed on a recording sheet by applying specific temperatures to the layer of color micro-capsules. Nevertheless, it is necessary to fix a developed color by irradiation, using a light of a specific wavelength. Accordingly, this color-image-forming system is costly, because an additional irradiation apparatus for the fixing of a developed color is needed, and electric power consumption is increased due to the additional irradiation apparatus. Also, since a heating process for the color development and an irradiation process for the fixing of a developed color must be carried out with respect to each color, this hinders a quick formation of a color image on the color-recording sheet.

SUMMARY OF THE INVENTION

Therefore, an object of the present invention is to provide an image-forming system, using a recording sheet coated with a layer of micro-capsules filled with dye or ink, in which an image can be quickly formed on the recording sheet at a low cost, without producing a large amount of waste material.

In accordance with an aspect of the present invention, there is provided an image-forming system comprising a recording member that includes a layer of a plurality of types of micro-capsules filled with dye, a conveyer unit that moves the recording member in a recording direction, and a plurality of thermal line heads that correspondingly heat the plurality of types of micro-capsules to different predetermined temperatures. Each micro-capsule disposed in said layer exhibits a temperature/pressure characteristic such that, when each micro-capsule is squashed under a predetermined pressure at a predetermined temperature, the dye seeps from the squashed micro-capsule. The thermal line heads extend perpendicularly to the recording direction and are aligned in the recording direction. Each thermal line head is controlled by a control signal corresponding to a line of the image to be developed by the thermal line head. At least two thermal line heads are driven simultaneously to develop the lines.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
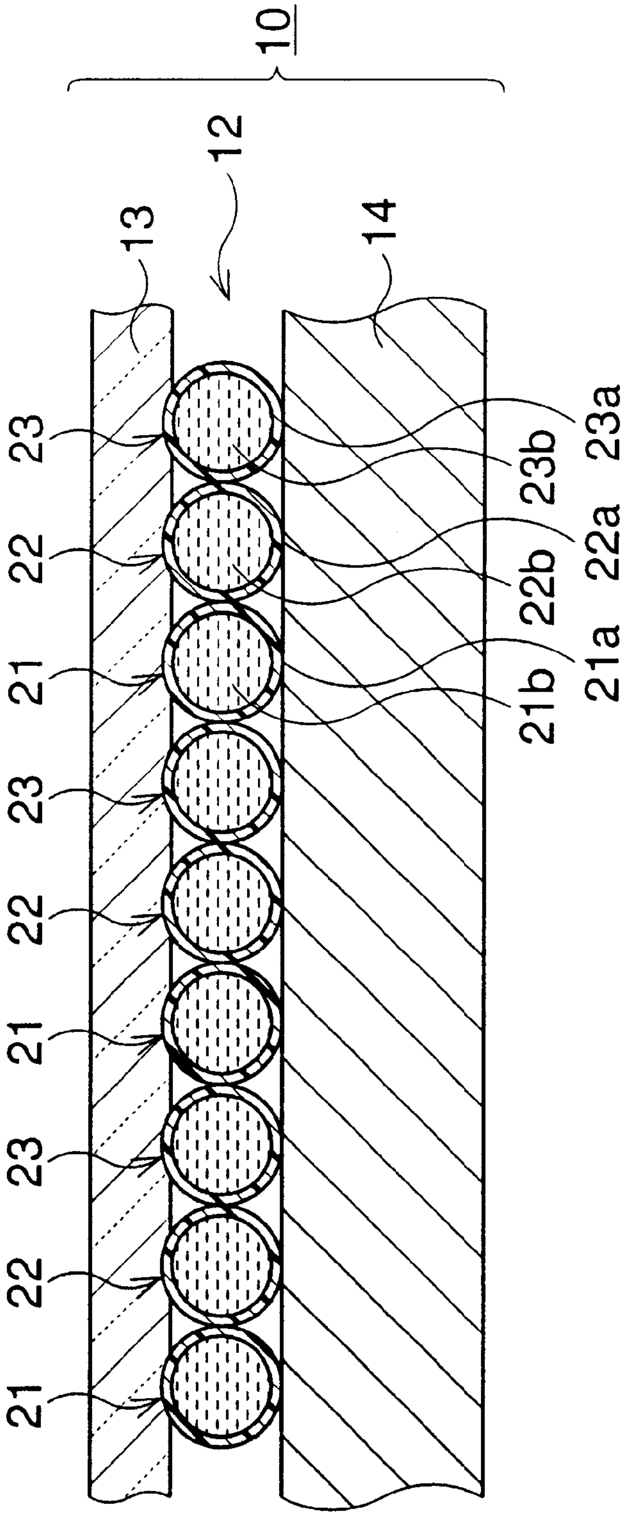
FIG. 1 is an enlarged cross-sectioned elevational view showing a recording sheet of a first embodiment.

FIG. 1 shows a first embodiment, in which a recording sheet, generally indicated by reference 10, is used in an image-forming system according to the present invention. In this first embodiment, the recording sheet 10 is produced in a form of a paper sheet. In particular, the recording sheet 10 comprises a base-layer sheet of paper 14, a layer of micro-capsules 12, and a sheet of protective transparent film 13 covering the layer of micro-capsules 12.

In the first embodiment, the layer of micro-capsules 12 is formed from three types of micro-capsules: a first type of micro-capsules 21 filled with cyan liquid dye or ink 21*b*, a second type of micro-capsules 22 filled with magenta liquid dye or ink 22*b*, and a third type of micro-capsules 23 filled with yellow liquid dye or ink 23*b*, and these micro-capsules 21, 22 and 23 are uniformly distributed in the layer of micro-capsules 12 using a well-known method not described here. Shell walls 21*a*, 22*a* and 23*a* of the micro-capsules 21, 22 and 23 have thicknesses of several microns, and are manufactured from a shape memory resin.

Figure 2:
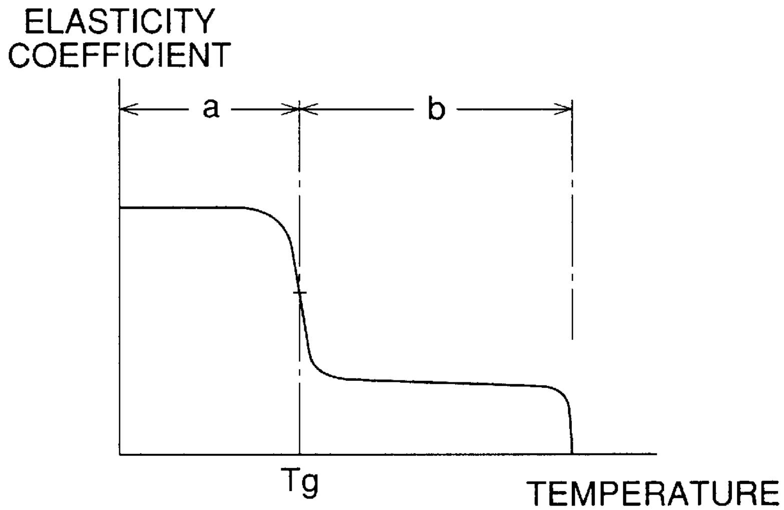
FIG. 2 is a graph showing a characteristic relationship between phase-transition temperature and elasticity coefficient of a capsule wall of a micro-capsule of the first embodiment.

In general, as shown in a graph of FIG. 2, the shape memory resin exhibits a coefficient of longitudinal elasticity, which abruptly changes at a glass-transition temperature boundary Tg. In the shape memory resin, micro-Brownian motion is frozen in a low temperature area "a", which is lower than the glass-transition temperature Tg, and thus the shape memory resin exhibits a glass-like phase. On the other hand, micro-Brownian motion of the molecular chain becomes increasingly energetic in a high-temperature area "b", which is higher than the glass-transition temperature Tg, and thus the shape memory resin exhibits a rubber elasticity.

The shape memory resin is named due to the following shape memory characteristic: after a mass of the shape memory resin is worked into a shaped article in the low-temperature area "a", when such a shaped article is heated over the glass-transition temperature Tg, the article becomes freely deformable. After the shaped article is deformed into another shape, when the deformed article is cooled to below the glass-transition temperature Tg, the other shape of the article is fixed and maintained. Nevertheless, when the deformed article is again heated to above the glass-transition temperature Tg, without being subjected to any load or external force, the deformed article returns to the original shape. The shape memory resin is a resin such as polynorbornene, trans-1, 4-polyisoprene, polyurethane and so forth.

Figure 3:
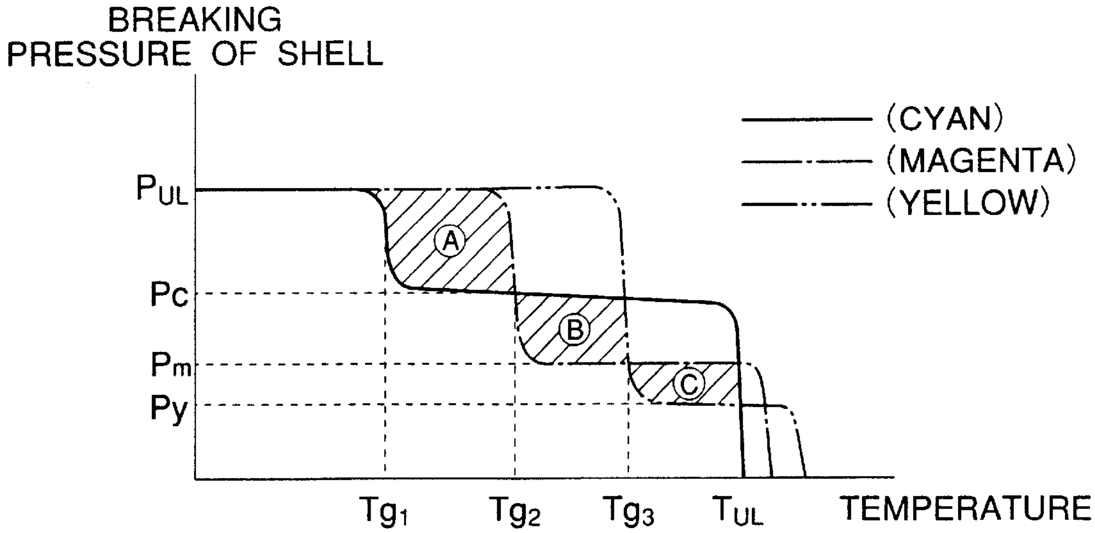
FIG. 3 is a diagram showing a characteristic relationship between temperature and breaking pressure of the capsule wall of the different types of micro-capsule of the first embodiment.

As shown in a graph of FIG. 3, the micro-capsules 21 are prepared so as to exhibit a characteristic breaking pressure having a glass-transition temperature Tg1, indicated by a solid line; the micro-capsules 22 are prepared so as to exhibit a characteristic breaking pressure having a glass-transition temperature Tg2, indicated by a single-chained line; and the micro-capsules 23 are prepared so as to exhibit a characteristic breaking pressure having a glass-transition temperature Tg3, indicated by a double-chained line. For example, the glass-transition temperature Tg1 may be set to a temperature selected from a range between 65° C. and 70° C., and the temperature Tg2 and Tg3 are set so as to increase in turn by 40° C. from the temperature set for Tg1. The glass-transition temperature Tg1, Tg2 and Tg3 are 65° C., 105° C., and 145° C., respectively, in this embodiment.

Figure 4:
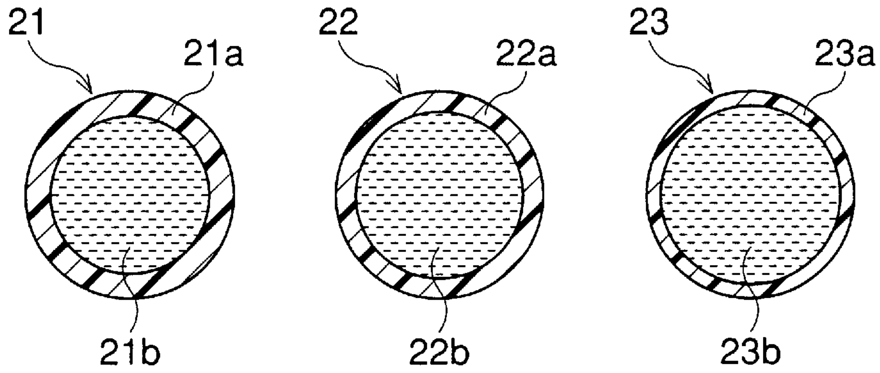
FIG. 4 is a cross-sectional view showing different types of micro-capsules utilized in the first embodiment.

As shown in FIG. 4, the thickness of the micro-capsule wall 21*a* of the cyan micro-capsules 21 is larger than the thickness of the micro-capsule wall 22*a* of the magenta micro-capsules 22, and the thickness of the micro-capsule wall 22*a* of the magenta micro-capsules 22 is larger than the thickness of the micro-capsule wall 23*a* of the yellow micro-capsules 23.

The wall thickness of the cyan micro-capsules 21 is selected such that each cyan micro-capsule 21 is broken and compacted under a breaking pressure that lies between a critical breaking pressure Pc and an upper limit pressure PUL, when each micro-capsule 21 is heated to a temperature between the glass-transition temperatures Tg1 and Tg2, as shown by a hatched area "A" in FIG. 3; the wall thickness of the magenta micro-capsule 22 is selected such that each magenta micro-capsule 22 is a like broken and compacted under a reading pressure that lies between a critical breaking pressure pm and the critical breaking pressure Pc, when each micro-capsule 22 is heated to a temperature between the glass-transition temperatures Tg2 and Tg3, as shown by a hatched area "B"; the wall thickness of the yellow-micro-capsule 23 is selected such that each yellow micro-capsule 23 is broken and compacted under a breaking pressure that lies between a critical breaking pressure Py and the critical breaking pressure Pm, when each micro-capsule 23 is heated to a temperature between the glass-transition temperature Tg3 and an upper limit temperature $T_{UL}$ as shown by a hatched area "C".

Note, when the glass-transition temperatures Tg1, Tg2 and Tg3 are set as mentioned above, the upper limit temperature $T_{UL}$ may be set to a temperature selected from a range between 185° C. and 190° C. Also, for example, the breaking pressure Py, Pm, Pc and $P_{UL}$ are set to 0.02, 0.2, 2.0 and 20 Mpa, respectively.

Figure 5:
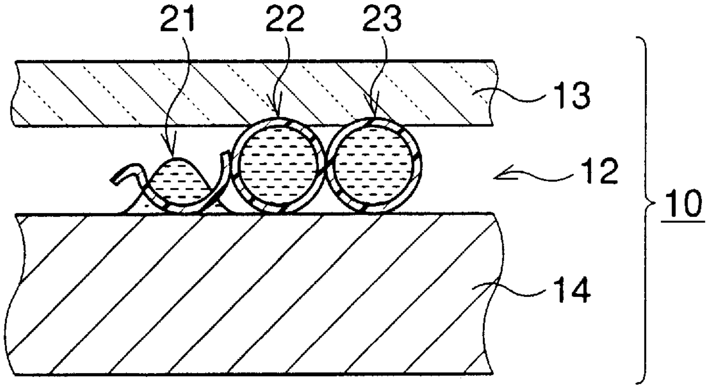
FIG. 5 is a conceptual cross-sectioned elevational view showing a micro-capsule being broken in the first embodiment.

For example, if the selected heating temperature and breaking pressure fall within a hatched cyan area A, only the cyan micro-capsules 21 are broken and squashed., as shown in FIG. 5. Also, if the selected heating temperature and breaking pressure fall within the hatched magenta area B, only the magenta micro-capsules 22 are broken and squashed. Further, if the selected heating temperature and breaking pressure fall within the hatched yellow area C, only the yellow micro-capsules 23 are broken and squashed.

The dye or ink (21*b*, 22*b*, 23*b*) in the broken micro-capsules (21, 22, 23) is discharged and a color is developed, in FIG. 5 the color being cyan. The broken wall 21*a* of the broken micro-capsule 21 in FIG. 5 remains on the sheet 14, however, the development of the color by the cyan ink or dye 21*b* is not influenced by the wall 21*a* because the wall 21*a* is very thin. The walls 21*a* to 23*a* match a color of the sheet 14, which is white in this embodiment.

As is apparent from the foregoing, by suitably selecting a heating temperature and a breaking pressure, which should be exerted on the recording sheet 10, it is possible to selectively break and squash the cyan, magenta and yellow micro-capsules 21, 22 and 23. Therefore, a color image can be produced from the cyan ink 21*b* or dye generating a cyan image, the magenta ink or dye 22*b* generating a magenta image and the yellow ink or dye 23*b* generating a yellow image.

Figure 6:
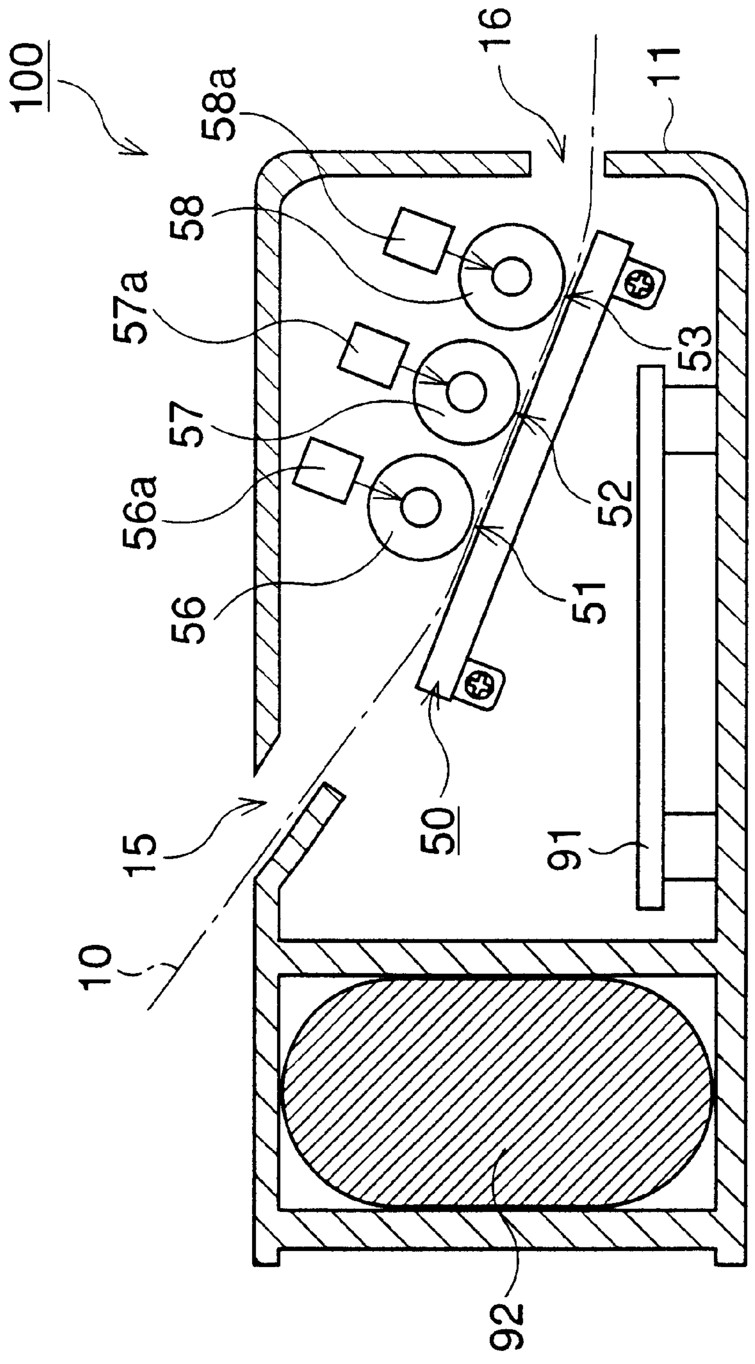
FIG. 6 is a cross-sectioned elevational view showing a high-resolution color printer for recording an image in the first embodiment.

FIG. 6 schematically shows a first embodiment of a color printer 100 as an image-forming system according to the present invention, which is constituted as a thermal line printer so as to form a color image on the recording sheet 10.

The color printer 100 comprises a rectangular parallelepiped housing 11 in a longitudinal direction, being perpendicular to the paper of the drawing of FIG. 6 as well as to a longitudinal direction of the recording sheet 10. An inlet opening 15 and an outlet opening 16 are provided in a top wall and front (right-hand side in FIG. 6) wall of the housing 11, respectively. The recording sheet 10 is introduced into the housing 11 through the inlet opening 15, and is then discharged from the outlet opening 16 after the formation of a color image on the recording sheet 10. A chained line in FIG. 6 represents the recording sheet 10 as well as a conveyer path of the recording sheet 10.

A guide plate 50 is provided in the housing 11 so as to define the conveyer path of the recording sheet 10, and a first thermal head 51, a second thermal head 52 and a third thermal head 53 are securely attached to a surface of the guide plate 50. Each thermal head (51, 52, 53) is formed as a thermal line head perpendicularly extending with respect to a direction of the movement of the recording sheet 10. The thermal line heads 51, 52 and 53 are aligned along the conveyer path, downstream in this order. Distances between the thermal line heads 51 and 52 and between the thermal line heads 52 and 53 are equal to each other, so that a control of the thermal line heads 51, 52 and 53 is simplified, as mentioned below.

As shown in FIG. 6, roller platens 56, 57 and 58, corresponding to the thermal line heads 51, 52 and 53, are disposed over the conveyer path for pressing the recording sheet 10 downwardly against the thermal line heads 51, 52 and 53. The platens 56, 57 and 58 are subjected to predetermined pressures p1, p2 and p3, respectively, by means of spring units 56*a*, 57*a* and 58*a*, resiliently biasing the roller platens 56, 57 and 58 towards the thermal line heads 51, 52 and 53, respectively. The roller platens 56, 57 and 58 are rotationally driven by motors 64, 65 and 66, shown in FIG. 7, respectively, at respective predetermined speeds in a counterclockwise direction in FIG. 6. The recording sheet 10 is thus conveyed downstream toward the outlet opening 16 by the rotating platens 56, 57 and 58 along the conveyer path. A control circuit board 91 for controlling the motors 64, 65 and 66 and other components is secured on an inner bottom surface of the housing 11. A battery 92 for supplying electric power to the motors (64, 65, 66), the control circuit board 91, and so on is held in a compartment at a side opposite to the surface of the outlet opening 16.

The roller platens 56, 57, 58 described above and illustrated in FIG. 6, which are rotationally driven by motors 64, 65 and 66 (FIG. 7) to convey the recording sheet 10 downstream toward the outlet opening 16 along the conveyor path constitute a conveyor unit.

A relationship between the heating temperatures T1, T2 and T3 of the thermal line heads 51, 52 and 53, and the glass-transition temperatures Tg1, Tg2 and Tg3 is T1<T2<T3, as well as, $Tg1<T1<Tg2<T2<Tg3<T3<T_{UL}$. A relationship between the pressures p1, p2 and p3 of the spring units 56*a*, 57*a* and 58*a*, and the critical breaking pressure Pc, Pm and Py is p3<p2<p1, as well as $Py<p3<Pm<p2<Pc<p1<P_{UL}$. The temperatures T1, T2 and T3 and the pressures p1, p2 and p3 are those applied to the micro-capsules 21, 22 and 23, within the capsule layer 12, and fall within the hatched areas A, B and C of FIG. 3, respectively.

The recording sheet 10, introduced through the inlet opening 15, moves toward the outlet opening 16 along the conveyer path. Thus, the recording sheet 10 is subjected to pressure p1 lying between the critical breaking pressure Pc and the upper limit pressure $P_{UL}$ when passing between the first thermal line head 51 and the first platen 56; the recording sheet 10 is subjected to pressure p2 lying between the critical breaking pressures Pm and Pc when passing between the second thermal line head 52 and the second platen 57; and the recording sheet 10 is subjected to pressure p3 lying between the critical breaking pressures Py and Pm when passing between the third thermal line head 53 and the third platen 58. When the cyan ink or dye 21*b* is to be discharged, the thermal line head 51 heats the micro-capsule layer 12 to a temperature T1 lying between glass-transition temperatures Tg1 and Tg2, in the hatched area A, in accordance with digital cyan image-pixel signals inputted to the printer 100; when magenta ink or dye 22*b* is to be discharged, the thermal line head 52 heats the micro-capsule layer 12 to a temperature T2 lying between glass-transition temperatures Tg2 and Tg3, in the hatched area B, in accordance with digital magenta image-pixel signals inputted to the printer 100; and when yellow ink or dye 23*b* is to be discharged, the thermal line head 53 heats micro-capsules to a temperature T3 lying between glass-transition temperatures Tg3 and the upper limit temperature $T_{UL}$, in the hatched area C, in accordance with digital yellow image-pixel signals inputted to the printer 100.

Figure 7:
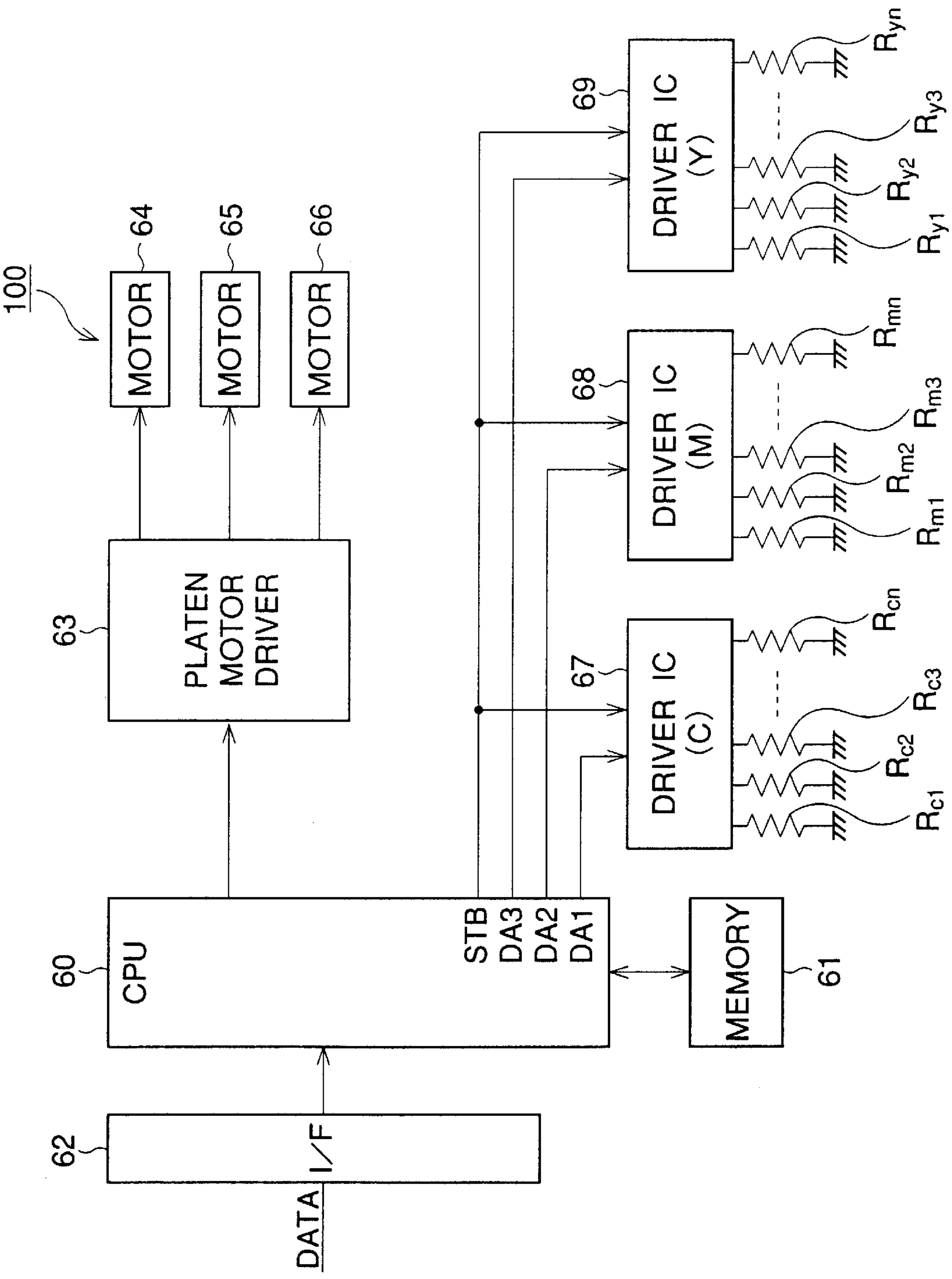
FIG. 7 is a block diagram showing a control system of the printer in the first embodiment.

FIG. 7 shows a schematic block diagram of the control circuit board 91 (FIG. 6). As shown in this drawing, the control circuit board 91 comprises a central processing unit (CPU) 60, which receives digital color-image-pixel signals (Data, in FIG. 7) from a personal computer or a word processor (not shown) through an interface circuit (I/F) 62, and the received digital color image-pixel signals, i.e. digital cyan image-pixel signals, digital magenta image-pixel signals and digital yellow image-pixel signals, are stored as a bit-map of each color component in a memory 61.

Also, the control circuit board 91 is provided with a platen motor driver circuit 63 for driving the three electric motors 64, 65 and 66, which are used to rotate the roller platens 56, 57 and 58, respectively. In this embodiment, each of the motors 64, 65 and 66 is a stepping motor, which is driven in accordance with a series of drive pulses outputted from the platen motor driver circuit 63, the outputting of the drive pulses from the platen motor driver 63 to the motors 64, 65 and 66 being controlled by the CPU 60.

The thermal line head 51 includes a plurality of heating elements Rc1, Rc2, . . . , Rcn (n:integer), and these heating elements Rc1 to Rcn are aligned along the total length of the thermal line head 51. The heating elements Rc1 to Rcn are selectively energized by a first driver IC 67 in accordance with a single-line of digital cyan image-pixel signals, and are heated to the temperature T1.

Also, the thermal line head 52 includes a plurality of heating elements Rm1, Rm2, . . . , Rmn, and these heating elements Rm1 to Rmn are aligned along the total length of the thermal line head 52. The heating elements Rm1 to Rmn are selectively energized by a second driver IC 68 in accordance with a single-line of digital magenta image-pixel signals, and are then heated to the temperature T2.

Further, the thermal line head 53 includes a plurality of heating elements Ry1, Ry2, . . . , Ryn , and these heating elements Ry1 to Ryn are aligned along the total length of the thermal line head 53. The heating elements Ry1 to Ryn are selectively energized by a third driver IC 69 in accordance with a single-line of digital yellow image-pixel signals, and are heated to the temperature T3.

As is apparent from FIG. 7, the respective driver ICs 67, 68 and 69 are controlled by control signals DA1, DA2 and DA3 output from the CPU, respectively, and are commonly controlled by a strobe signal STB output from the CPU. The strobe signal STB is a signal of a square wave pulse, which allows determination of the heating temperature (T1,T2, T3) of the heating elements (Rcn, Rmn, Ryn) of the thermal line heads 51, 52 and 53. By using the single strobe signal STB and with the heating elements Rc1 to Rcn of the thermal line head 51, the heating elements Rm1 to Rmn of the thermal line head 52, and the heating elements Ry1 to Ryn of the thermal line head 53 differing in resistance, the heating temperatures are able to reach the respective heating temperatures T1, T2 and T3, in a same heating time.

The control signal DA1 corresponds to one line of cyan image-pixel signals; the control signal DA2 corresponds to one line of magenta image-pixel signals; and the control signal DA3 corresponds to one line of yellow image-pixel signals. The thermal line heads 51, 52 and 53 are simultaneously heated to temperatures T1, T2 and T3 for discharging the cyan, magenta and yellow ink or dye (21*b*, 22*b*, 23*b*), respectively, on different lines separated by the distances between the thermal line heads 51 and 52, and between the thermal line heads 52 and 53. Therefore, the control signals DA1, DA2 and DA3 correspond to the cyan, magenta and yellow image-pixels of the separated three lines. The printing speed is therefore high due to the three colors (21*b*, 22*b*, 23*b*) being simultaneously developed on the recording sheet 10.

As mentioned above, even though the distance between the thermal line heads 51 and 52 is equal to the distance between the thermal line heads 52 and 53, line printing density of the color printer 100 is freely determinable regardless of a relationship between the two distances, thus making the control of the thermal heads (51, 52 and 53) and the roller platens (56, 57 and 58) simple.

Figure 8:
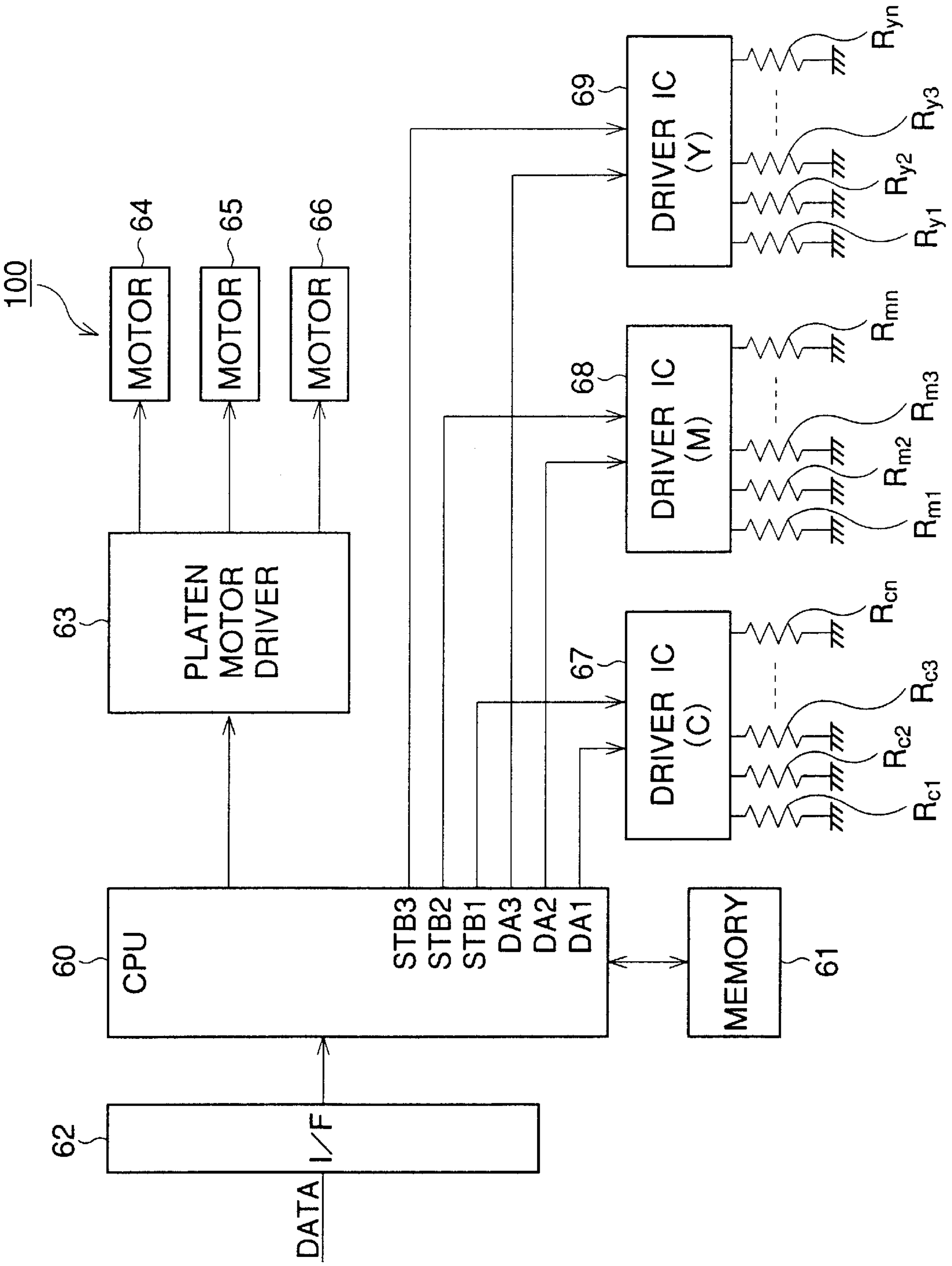
FIG. 8 is a block diagram showing a control system of the printer in a second embodiment.

FIG. 8 shows a schematic block diagram of the control circuit board 91 in a second embodiment. The second embodiment differs from the first embodiment in that the CPU 60 outputs independent strobe signals STB1, STB2 and STB3 for the driver ICs 67, 68 and 69, respectively. The heating temperature T1 of the heating elements Rc1 to Rcn, the heating temperature T2 of the heating elements Rm1 to Rmn, and the heating temperature T3 of the heating elements Ry1 to Ryn are thus independently controlled. The characteristics, such as resistance of the heating elements (Rcn, Rmn, Ryn) can be more freely selected by the independent control. For example, all of the heating elements (Rcn, Rmn, Ryn) may have the same resistance value, the different temperatures T1, T2 and T3 being obtained by supplying the strobe signals STB1, STB2 and STB3 with different pulse widths, thereby obtaining longer or shorter heating times as is required. Furthermore, when it is possible that a heating element (Rcn, Rmn, Ryn) is overheated due to continuous heating, the respective strobe signal STB1, STB2 or STB3 can be adjusted so as to prevent the overheating.

When the recording sheet 10 is substituted for heat-sensitive paper, the printer 100 can work as an extremely high-speed thermal printer, as monochrome pixels are simultaneously generated on the heat-sensitive paper by the three thermal line heads.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 10-73453 (filed on Mar. 6, 1998) which is expressly incorporated herein, by reference, in its entirety.

What is claimed is:

1. An image-forming system that records an image through selective heat and pressure application, the system comprising:

a recording member that includes a layer of a plurality of types of micro-capsules filled with dye, each micro-capsule disposed in said layer exhibiting a temperature/pressure characteristic such that, when said each micro-capsule is squashed under a predetermined pressure at a predetermined temperature, said dye seeps from said squashed micro-capsule, each of said plurality of types of micro-capsules being squashed under different predetermined pressures at different predetermined temperatures;

a conveyer unit that moves said recording member in a recording direction, said conveyer unit locally applying said different predetermined pressures to said recording member; and a plurality of thermal line heads that correspondingly heat said plurality of types of micro-capsules to said different predetermined temperatures, said thermal line heads extending perpendicular to said recording direction and aligned in said recording direction, a control system that controls each of said thermal line heads by a common control signal corresponding to a line of said image to be recorded by said thermal line head, at least two of said thermal line heads being driven to simultaneously recorded said lines;

wherein each of said plurality of thermal line heads include a plurality of heating elements of predetermined resistance, the predetermined resistance of each of said plurality of thermal heads being different from the predetermined resistance of another of said plurality of thermal heads, and a controller that controls each of said thermal line heads to have equal heating times so that said thermal line heads are heated to said different predetermined temperatures.

2. The image-forming system of claim 1, wherein said plurality of thermal line heads correspond to colors cyan, magenta and yellow.

3. The image-forming system of claim 1, wherein each of said types of micro-capsules includes a shell-wall of a corresponding glass-transition temperature and a corresponding thickness.

4. The image-forming system according to claim 1, said common control signal comprising a strobe signal having a square wave pulse.

5. The image-forming system of claim 1, said conveyor unit comprising a plurality of roller platens, each roller platen corresponding to one of said plurality of thermal line heads.

6. The image-forming system of claim 5, further comprising a spring unit resiliently biasing each of said roller platens towards the corresponding thermal line head.

7. The image-forming system of claim 5, further comprising a drive system for driving each of said roller platens.

8. An image-forming system that records an image through selective heat and pressure application, the system comprising:

a recording member that includes a layer of a plurality of types of micro-capsules filled with dye, each micro-capsule disposed in said layer exhibiting a temperature/pressure characteristic such that, when said each micro-capsule is squashed under a predetermined pressure at a predetermined temperature, said dye seeps from said squashed micro-capsule, each of said plurality of types of micro-capsules being squashed under different predetermined pressures at different predetermined temperatures;

a conveyer unit that moves said recording member in a recording direction, said conveyer unit locally applying said different predetermined pressures to said recording member; and a plurality of thermal line heads that correspondingly heat said plurality of types of micro-capsules to said different predetermined temperatures, said thermal line heads extending perpendicular to said recording direction and aligned in said recording direction, a control system that controls each of said thermal line heads by independent control signals corresponding to a line of said image to be recorded by said thermal line head, at least two of said thermal line heads being driven to simultaneously record said lines;

wherein each of said plurality of thermal line heads include a plurality of heating elements of equal predetermined resistance, the predetermined resistances of each of said plurality of thermal line heads being equal and a controller that controls each of said thermal line heads so that said thermal line heads are heated to said different predetermined temperatures.

9. The image-forming system of claim 8, wherein said plurality of thermal line head corresponding to colors cyan, magenta and yellow.

10. The image-forming system of claim 8, wherein each of said types of micro-capsules include a shell-wall of a corresponding glass-transition temperature and a corresponding thickness.

11. The image-forming system of claim 8, said conveyor unit comprising a plurality of roller platens, each roller platen corresponding to one of said plurality of thermal line heads.

12. The image-forming system of claim 11, further comprising a spring unit resiliently biasing each of said roller platens towards the corresponding thermal line head.

13. The image-forming system of claim 11, further comprising a drive system for driving each of said roller platens.

14. The image-forming system according to claim 6, the independent control signals comprising independent strobe signals with different pulse widths.

* * * * *